(12) United States Patent
Clamen et al.

(10) Patent No.: US 7,579,289 B2
(45) Date of Patent: Aug. 25, 2009

(54) WATER REPELLANT CURABLE AQUEOUS COMPOSITIONS

(75) Inventors: Guy Clamen, Opio (FR); Nolwenn Colmou, Nice (FR); William C. Finch, Blue Bell, PA (US); Barry Weinstein, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 144 days.

(21) Appl. No.: 11/496,193

(22) Filed: Jul. 31, 2006

(65) Prior Publication Data

US 2008/0009209 A1 Jan. 10, 2008

Related U.S. Application Data

(63) Continuation-in-part of application No. 11/481,144, filed on Jul. 5, 2006.

(51) Int. Cl.
*B32B 3/00* (2006.01)
*D03D 15/00* (2006.01)
*C08G 63/00* (2006.01)
*B05D 1/36* (2006.01)
*B05D 7/00* (2006.01)

(52) U.S. Cl. ............... 442/59; 442/97; 442/108; 442/181; 528/271; 427/407.1; 427/412.5

(58) Field of Classification Search ............. 442/59
See application file for complete search history.

(56) References Cited

U.S. PATENT DOCUMENTS

| | | | |
|---|---|---|---|
| 5,763,524 A | 6/1998 | Arkens et al. | |
| 6,099,773 A | 8/2000 | Reck et al. | |
| 6,114,464 A | 9/2000 | Reck et al. | |
| 6,262,159 B1 | 7/2001 | Dreher et al. | |
| 6,348,530 B1 | 2/2002 | Reck et al. | |
| 2002/0058449 A1* | 5/2002 | Velpari et al. | ............... 442/59 |
| 2003/0027915 A1 | 2/2003 | Gerst et al. | |
| 2005/0004309 A1 | 1/2005 | Gerst et al. | |
| 2007/0006390 A1 | 1/2007 | Clamen et al. | |

FOREIGN PATENT DOCUMENTS

| | | |
|---|---|---|
| EP | 583086 A1 * | 2/1994 |
| EP | 1 510 618 A1 | 3/2005 |
| EP | 1 741 726 A | 1/2007 |
| WO | WO 97/45461 A | 12/1997 |
| WO | WO 99/02591 A | 1/1999 |

* cited by examiner

*Primary Examiner*—D. Lawrence Tarazano
*Assistant Examiner*—Altrev C Sykes
(74) *Attorney, Agent, or Firm*—Andrew E. C. Merriam

(57) ABSTRACT

According to the present invention, water repellant curable compositions comprise: (i) one or more polyacid; (ii) one or more polyol comprising at least two hydroxyl groups; (iii) one or more reactive waterproofing agent chosen from a $C_5$ to $C_{30}$ alk(en)yl monocarboxylate of a (poly)ethoxylated trihydric polyol, $C_5$ to $C_{30}$ alk(en)ylamine (poly)alkoxylate, $C_5$ to $C_{30}$ alk(en)yl diamine (poly)alkoxylate, $C_5$ to $C_{30}$ alk(en)ylamine (poly)alkoxylate containing an ether or thiother group in the alk(en)ylamine group, and mixtures thereof. The compositions are dilutable with water to make thermosetting aqueous binder compositions. The present invention also provides methods of treating or contacting substrates chosen from a non-woven, woven and a composite, such as glass fiber substrates, with the thermosetting aqueous binder compositions, and drying and curing, and the water resistant products produced thereby.

9 Claims, No Drawings

WATER REPELLANT CURABLE AQUEOUS COMPOSITIONS

The present invention is a Continuation In Part of U.S. application Ser. No. 11/481,144, filed Jul. 05, 2006. The present invention relates to curable compositions having improved resistance to water absorption, to methods of use thereof as binders for fibrous substrates and composites, and to the products produced by those methods. More particularly, the present invention relates to aqueous thermosetting binder compositions comprising one or more polyacid, one or more polyol, and one or more reactive waterproofing agents, and the use thereof as binders for heat-resistant fibers and nonwovens.

Fibrous substrates such as heat resistant nonwovens may comprise matted fibers bonded together by a cured thermosetting resinous material. In making fiberglass insulation, for example, drawn glass fibers of random lengths are randomly deposited as a mat and, while still hot from drawing, are sprayed with an aqueous binder which is dried and cured. Due to their excellent cost/performance ratio, the thermosetting fiberglass binder resins of choice in the past have been phenol/formaldehyde resins.

Phenol/formaldehyde resins can be economically produced, and can be extended with urea prior to use as a binder in many applications. Over the past several decades however, increasingly stringent regulation and awareness of the environmental risks posed by phenol/formaldehyde resins such as the declaration by the World Health Organization that formaldehyde is a human carcinogen have led industry to minimize formaldehyde emissions and to investigate formaldehyde free binder systems.

Polycarboxy polymers, such as acrylic resins, have been found useful for making formaldehyde free fiberglass insulation products. Fiberglass treated and cured with acrylic thermoset resins has excellent mechanical properties and is resistant to water, however, the resulting cured product should desirably provide improved water repellent properties in use. For example, glass fiber-containing materials incorporating acrylic thermoset binders tend adsorb water, becoming soft and limp when wet. To solve this problem, binder formulators have added waterproofing agents such as waxes, fatty acids, latices, polyurethanes, acrylic emulsion copolymers or latices, and polysiloxanes or silicones to the acrylic resins. Unfortunately, such waterproofing agents can agglomerate in aqueous thermoset formulations, can provide unwanted properties such as discoloration, non-oxidizable residues or toxicity hazards. For example, waterproofing latices are unstable in use at low pH in aqueous binders containing strong acid catalysts or accelerator. Further, polysiloxanes and polyurethanes can be very costly to use. In addition, waterproofing methods of adding ingredients which do not form part of the cured matrix are not durable; such waterproofing agents can be burnished and, thus, removed from the substrate.

U.S. Pat. No. 6,849,683 to Husemoen et al., discloses binders for mineral fibers which comprise the resinous reaction product of a di-, tri- or tetra-carboxylic acid and an alkanolamine mixed with water and a separate carboxylic acid group containing polymer, e.g. polyacrylic acid (pAA). The alleged advantage of such compositions lies in the resistance of the binder treated fiber products to heat and humidity. However, none of the compositions provides products that are water repellant when cured.

Accordingly, the present inventors have endeavored to provide aqueous thermosetting binders for fibrous substrates and composites that enable higher levels of waterproofing than is provided by the current technology, at a cost that can compete with phenol/formaldehyde resins, and without posing the environmental hazards of formaldehydes.

The present invention provides curable compositions comprising:

(i) one or more polyacid comprising at least two carboxylic acid groups, anhydride groups, or salts thereof;

(ii) one or more polyol comprising at least two hydroxyl groups;

(iii) one or more reactive waterproofing agent chosen from a $C_5$ to $C_{30}$ alk(en)yl 2-hydroxyethyl (alk(en))amide, $C_5$ to $C_{30}$ alk(en)yl bis(2-hydroxyethyl) amide, $C_{11}$ to $C_{30}$ alk(en)yl 2-hydroxyethyl (alk(en))amine, $C_{11}$ to $C_{30}$ alk(en)yl bis(2-hydroxyethyl) amine, $C_{11}$ to $C_{30}$ alk(en)yl tris(2-hydroxyethyl)amine, $C_5$ to $C_{30}$ alk(en)yl monoglyceride, $C_5$ to $C_{30}$ alk(en)yl monocarboxylate of a trihydric polyol, $C_5$ to $C_{30}$ alk(en)yl monocarboxylate of a (poly)alkoxylated trihydric polyol, $C_5$ to $C_{30}$ alk(en)ylamine (poly)alkoxylate, $C_5$ to $C_{30}$ alk(en)yldiamine (poly)alkoxylate, $C_5$ to $C_{30}$ alk(en)ylamine (poly)alkoxylate having an ether or thiother group in the alk(en)ylamine, and mixtures thereof; and, (iv), optionally, one or more phosphorous-containing accelerator, wherein the ratio of the number of equivalents of said carboxylic acid groups, anhydride groups, or salts thereof to the total number of equivalents of said hydroxyl groups is from 1/0.01 to 1/3. Preferably, the polyacids (i) comprise addition (co)polymers, such as polyacrylic acid (pAA), and pAA (co)polymers. The compositions of the present invention provide concentrates that can be diluted with water or one or more aqueous solvent to provide aqueous curable binder compositions. Preferably, the polyols (ii) comprise trihydric polyols, such as triethanolamine (TEOA), glycerol or trimethylolpropane (TMP). Preferably, the reactive waterproofing agents (iii) may be chosen from one or more $C_{8-18}$ hydroxyethyl amide, $C_{8-18}$ alk(en)yl bis(2-hydroxyethyl) amide, $C_{11-18}$ alk(en)yl diethanolamine, $C_{8-18}$ alk(en)yl monoglyceride or monocarboxylate of a trihydric polyol, $C_8$ to $C_{18}$ alk(en)yl monoglyceride or monocarboxylate of a (poly)alkoxylated trihydric polyol, $C_8$ to $C_{18}$ alk(en)yl(di)amine (poly)alkoxylate, $C_8$ to $C_{18}$ alk(en)ylamine (poly)alkoxylate containing an ether or thiother group in the alk(en)ylamine group, or mixtures thereof, such as the cocamides of ethanolamine (cocamide MEA) or diethanolamine (cocamide DEA) or $C_{12}$ alk(en)yl (di)ethanolamides. To hasten their rate of cure, the curable compositions may further comprise one or more phosphorus-containing accelerator.

In addition, curable compositions suitable for glass fiber or mineral wool substrates of the present invention may further comprise one or more coupling agents, such as a silane. Further, to enhance surface coverage, the curable compositions may further comprise one or more surfactants.

In one embodiment, the curable compositions may further comprise one or more strong acid catalyst having a pKa of $\leq 3.0$, such as a mineral acid or polybasic acid, such as citric acid, and may have a pH of $\leq 4.5$, preferably $\leq 3.5$. Further, the curable compositions may comprise one or more strong acid catalyst plus one or more organic polyacid, such as citric acid which lowers viscosity of the formulation and participates in cure.

In addition, the present invention provides methods for treating, coating or impregnating composites and fibrous substrates, such as heat-resistant nonwovens like fiberglass insulation, comprising:

forming a curable aqueous composition comprising admixing the curable compositions of the present invention with water or one or more aqueous solvent;

contacting said substrate with said curable aqueous composition or, alternatively, applying said curable aqueous composition to said substrate; and heating said curable aqueous composition at a temperature of from 100° C. to 400° C.

Still further, the present invention provides fibrous articles, non-woven article or composite substrates prepared by the methods of the present invention, including heat-resistant nonwovens, e.g. fiberglass insulation, and composites, such as sheets or ceiling panels.

The reactive waterproofing agents of the present invention may readily be derived from natural sources, such as vegetable and plant oils, and are readily available. Further, vegetable and plant oils comprise a distribution of monoalk(en)yl carboxylic acid and monoalk(en)yl glyceride compounds. For example, coconut oil, from which reactive waterproofing agents may be derived, comprises a distribution of monoglycerides, some as small as $C_4$, most being $C_{12}$ and some as large as $C_{18}$, thereby enabling provision of single reactive waterproofing agents to have more hydrophobic longer chain alk(en)yl groups for waterproofing and shorter chain alk(en)yl groups for ease of formulation into water. Moreover, the waterproofing agents of the present invention also participate in the thermal cure, thereby lowering the cure-onset temperature and the cure energy of polyacid/polyol binders. Finally, because the waterproofing agents of the present invention react and become part of the thermoset matrix; as such, they do not burnish from treated substrates.

All ranges recited are inclusive and combinable. For example, an average particle size of 1.3 µm or more, for example, 1.5 µm or more, which may be 4.5 µm or less, or 4.0 µm or less, will include ranges of 1.3 µm or more to 4.5 µm or less, 1.5 µm or more to 4.5 µm or less, 1.5 µm or more to 4.3 µm or less, and 1.3 µm or more to 4.3 µm or less.

Unless otherwise indicated, all temperature and pressure units are standard temperature and pressure (STP).

All phrases comprising parenthesis denote either or both of the included parenthetical matter and its absence. For example, the phrase "(co)polymer" includes, in the alternative, polymer, copolymer and mixtures thereof.

As used herein, the phrase "addition polymer" refers to any (co)polymer that comprises ethylenically unsaturated monomers as (co)polymerized units, such as poly(acrylic acid) (pAA).

As used herein, the phrase "alkyl" means any aliphatic alkyl group having five or more carbon atoms, the alkyl group including n-alkyl, s-alkyl, i-alkyl, t-alkyl groups or cyclic aliphatics containing one or more 5, 6 or seven member ring structures.

As used herein, the phrase "alk(en)yl" means any combination of alkyl, alkenyl or aromatic groups having five or more carbon atoms, the alkyl groups are as defined previously, the alkenyl group may comprise a branched, straight chain or cyclic carbon array having at least one double bond or at least one aromatic group, such as phenyl or naphthyl.

As used herein, the phrase "aqueous" or "aqueous solvent" includes water and mixtures comprising water and one or more water-miscible solvent.

As used herein, the phrase "based on the total weight of binder solids" or "based on total binder solids" refers to weight amounts in comparison to the total amount of polyacids, polyols, including reactive waterproofing agents, reactive amphiphilic polyols and any other reactive polyols, and waterproofing agents.

As used herein, the phrases "$C_3$-$C_{12}$" or "$C_3$-$C_6$" refer to organic compounds or structural portions of organic compounds containing 3 to 12 carbon atoms and 3 to 6 carbon atoms, respectively.

As used herein, unless otherwise indicated, the phrase "copolymer" includes, independently, copolymers, terpolymers, block copolymers, segmented copolymers, graft copolymers, and any mixture or combination thereof.

As used herein, the phrase "formaldehyde-free composition" refers to compositions substantially free from added formaldehyde, and which do not liberate substantial formaldehyde as a result of drying and/or curing.

As used herein, the phrase "gradual addition" refers to polymerization in which monomers are fed into a reaction vessel over time.

As used herein, the phrase "heat-resistant fibers" means fibers which are substantially unaffected by exposure to temperatures of from 125° C. to 400° C. during processing.

As used herein, the term "maleic" comprises either maleic acid or maleic anhydride independently of each other, unless otherwise indicated.

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "molecular weight" refers to the weight average molecular weight of a polymer as measured by gel permeation chromatography (GPC) against a polyacrylic acid standard.

As used herein, the phrase "(poly)alkoxylated" or "(poly)alkoxylate" refers to a molecule containing one or more oxyethylene or oxypropylene group, a mixture thereof, or a combination thereof, preferably, one or more oxyethylene group.

As used herein, the phrase "polybasic" means having at least two reactive acid functional groups or salts or anhydrides thereof (see e.g. *Hawley's Condensed Chemical Dictionary*, 14$^{th}$ Ed., 2002, John Wiley and Sons, Inc.).

As used herein, the phrases "polyol" and "polyhydroxy" refer to organic compounds or structural portions of organic compounds containing two or more hydroxy groups.

As used herein, the phrase "trihydric polyol" refers to any polyol having three or more hydroxyl groups.

As used herein, the phrase "wt. %" stands for weight percent.

The formaldehyde-free curable compositions contain one or more polyacid (i). The polyacid must be sufficiently non-volatile that it will substantially remain available for reaction with the polyol in the composition during heating and curing operations. The polyacid may be one or more polymeric polyacid, one or more low molecular weight polyacid, or mixtures thereof.

Low molecular weight polyacids may be compounds having with a molecular weight less than about 1000 bearing at least two carboxylic acid groups, anhydride groups, or salts thereof, such as, polybasic carboxylic acids and anhydrides, or their salts. Exemplary polybasic acids and anhydrides may include, citric acid, butane tricarboxylic acid, maleic acid, maleic anhydride, fumaric acid, succinic acid, succinic anhydride, sebacic acid, azelaic acid, adipic acid, glutaric acid, tartaric acid, itaconic acid, trimellitic acid, hemimellitic acid, trimesic acid, tricarballylic acid, cyclobutane tetracarboxylic acid, 1,2,3,4-butanetetracarboxylic acid, pyromellitic acid, oligomers of carboxylic acid, and the like, and salts thereof. Optionally, the low molecular weight polybasic carboxylic acid, anhydride or salt thereof may be mixed with the hydroxyl-containing compound, under reactive conditions, prior to mixing with one or more polymeric polyacid.

The one or more polymeric polyacid may be chosen from, for example, polyesters containing at least two carboxylic acid groups, addition (co)polymers or oligomers containing at least two copolymerized carboxylic acid-functional monomers and oligomers of polybasic acids or their salts or anyhydrides. Preferably, the one or more polymeric polyacid is chosen from addition (co)polymers formed from at least one ethylenically unsaturated monomer, most preferably polymers and copolymers of (meth)acrylic acid. The addition (co)polymers may be in the form of solutions of the addition (co)polymer in an aqueous medium such as, for example, an alkali-soluble resin which has been solubilized in a basic medium; in the form of aqueous dispersions such as, for example, an emulsion-polymerized dispersion; or in the form of aqueous suspensions.

Suitable addition (co)polymers contain at least two carboxylic acid groups, anhydride groups, or salts thereof formed from the addition polymerization of one or more ethylenically unsaturated carboxylic acids, anhydrides and salts thereof and, optionally, one or more comonomers. Ethylenically unsaturated carboxylic acids or anhydrides may include, for example, methacrylic acid, acrylic acid, crotonic acid, fumaric acid, maleic acid, 2-methyl maleic acid, itaconic acid, citraconic acid, mesaconic acid, cyclohexenedicarboxylic acid, 2-methyl itaconic acid, α-methylene glutaric acid, monoalkyl maleates, and monoalkyl fumarates, and salts thereof; ethylenically unsaturated anhydrides, such as, for example, maleic anhydride, itaconic anhydride, acrylic anhydride, and methacrylic anhydride, and salts thereof. Preferred monomers may include carboxylic acid groups, anhydride groups, or salts are (meth)acrylic acid and maleic acid, and salts thereof, and maleic anhydride. The monomers including carboxylic acid groups, anhydride groups, or salts are used at a level of from 1 wt. % or more, based on the weight of the polymer, or 10 wt. % or more, or, 25 wt. % or more, preferably 30 wt. % or more, or, more preferably 75 wt. % or more, or, even more preferably 85 wt. % or more, and up to 100 wt. %, for example, up to 99 wt. %, or up to 90 wt. %. Suitable ethylenically unsaturated comonomers may include one or more acrylic ester monomers including methyl acrylate, ethyl acrylate, butyl acrylate, 2-ethylhexyl acrylate, decyl acrylate, methyl methacrylate, butyl methacrylate, isodecyl methacrylate: Hydroxyl group containing monomers, such as hydroxyethyl acrylate, hydroxyethyl methacrylate, hydroxypropyl methacrylate and allyloxy functional hydroxyl group-containing monomers; acrylamide or substituted acrylamides, such as t-butylacrylamide; styrene or substituted styrenes; butadiene; vinyl acetate or other vinyl esters; acrylonitrile or methacrylonitrile; and the like. Preferable comonomers include one or more ethylenically unsaturated monomer having a solubility of less than 2 g/100 g of water at 25° C., one or more allyloxy functional hydroxyl group-containing monomers; one or more phosphorous-containing comonomers, such as vinyl phosphonic acid, phosphoalkyl (meth)acrylates, or salts thereof; or one or more strong acid functional monomers, such as vinyl sulfonic acid monomers, and their salts; or mixtures of any of such comonomers.

The one or more preferred addition comonomers having a solubility of less than 2 g/100 g of water at 25° C. may be chosen from ethyl (meth)acrylate, methyl methacrylate, butyl (meth)acrylate, styrene, mono-alkyl (meth)acrylamide, di-alkyl (meth)acrylamide and t-alkyl neopentyl alkyl acrylamides. Such comonomers may be included in the addition monomer mixture in the amount of 3 or more wt. %, or 10 or more wt. %, and as much as 25 wt. % or less, or 20 wt. % or less, or 15 wt. % or less, based on the total weight of monomers used to make the addition copolymer.

The one or more preferred allyloxy functional hydroxyl group-containing monomers may be chosen from hydroxyl group-including monomers of Formula I,

$$CH2=C(R1)CH(R2)OR3 \qquad (I)$$

wherein R1 and R2 are independently selected from hydrogen, methyl, and —CH2OH; and R3 is selected from hydrogen, —CH2CH(CH3)OH, —CH2CH2OH, C(CH2OH)2-C2H5, and (C3-C12) polyol residues; or of Formula II,

(II)

wherein R is selected from CH3, Cl, Br, and C6H5; X is a covalent bond, a divalent methylene or a divalent $C_2$ to $C_6$ alkylene or alk(ox)ylene group; and R1 is selected from H, OH, CH2OH, CH2CH2OH, CH(CH3)OH, glycidyl, CH(OH)CH2OH, and (C3-C12)polyol residues. Such allyloxy functional hydroxyl-group containing monomers may be included in the addition monomer mixture at a level of up to 99 wt. %, or up to 70 wt. %, preferably, up to 30 wt. %, based on the total weight of the monomer mixture, and can be used in amounts of 1 wt. % or more, or 10 wt. % or more, based on the total weight of the monomer mixture. Monomers of Formula I and Formula II can be prepared by a variety of synthetic routes known to those skilled the art. For example, allyl chloride can be reacted with various polyhydroxy compounds to give, for example, the corresponding allyloxy derivatives of sugars, glycerine, trimethylolpropane (TMP) and pentaerythritol. Vinyl glycols may be prepared by methods such as those described in U.S. Pat. No. 5,336,815. Allyloxy compounds that would hydrolyze to allyloxy compounds of Formula I under the conditions of aqueous polymerization, for example allyl glycidylether, are also useful as monomers to produce polymer additives of the present invention.

The ($C_3$-$C_{12}$)-containing polyols useful to prepare allyloxy compounds of Formula I include, for example, ($C_3$-$C_6$)-polyhydroxy compounds such as erythritol, pentaerythritol and glycerine; sugar alcohols such as xylitol, sorbitol and mannitol; and, polyhydroxy aldehyde and ketone sugars such as glucose, fructose, galactose, maltose, sucrose, lactose, erythrose and threose. Examples of suitable unsaturated non-ionizable monomers of Formula (II) include allyl alcohol, methallyl alcohol, allyloxyethanol, allyloxypropanol, 3-allyloxy-1,2-propanediol, trimethylolpropane allyl ether, allyloxy(sugars), such as allyloxy(glucose), allyloxy(fructose) and allyloxy(mannose), erythritol monoallyl ether, pentaerythritol monoallyl ether, and 1-butene-3,4-diol. The most preferred monomers of Formula I and Formula II are allyl alcohol and 3-allyloxy-1,2-propanediol.

The one or more polyacid addition (co)polymer may suitably have a weight average molecular weight of 1000 or more, and the molecular weight may range as high as to 10,000,000 or, preferably, as high as 250,000, or, more preferably, as high as 100,000, yet even more preferably, as high as 10,000, yet even still more preferably, as high as 5,000. Higher molecular weight alkali-soluble resins can lead to curable compositions which exhibit excessive viscosity. Accordingly, when the addition polymer is an alkali-soluble resin which comprises the reaction product of one or more carboxylic acid, anhydride, or salt thereof, in the amount of from 5 wt. % or more, or 20 wt. % or more, preferably 25 wt. % or more, for example 30 wt. %, based on the total weight of the monomers used to make the addition polymer, a molecular weight from 500 to 20,000 is preferred.

In another embodiment of the present invention the polyacid addition (co)polymers may be oligomers or co-oligomers of ethylenically-unsaturated carboxylic acids prepared by free radical addition polymerization, having a number average molecular weight of between 300 and 900.

The one or more polyacid addition (co)polymer may preferably be prepared by solution polymerization, and may also be prepared by emulsion polymerization, or suspension polymerization techniques for polymerizing ethylenically-unsaturated monomers which are well known in the art.

The polymerization reaction to prepare the copolymer component can be initiated by various methods known in the art, such as, preferably, by using the thermal decomposition of one or more initiators, for example, by using an oxidation-reduction reaction ("redox reaction") to generate free radicals to effect the polymerization. Preferred thermal initiators may comprise peracids, such as persulfates, perborates, and periodates. Redox initiator systems may contain at least one peroxide-containing compound in combination with a redox co-initiator, for example, a reductive sulfur compound such as a bisulfite, sulfite, thiosulfate, dithionite, or tetrathioate of alkali metals and ammonium compounds. Thus, it is possible to employ combinations of peroxodisulfates with alkali metal hydrogen sulfites or ammonium hydrogen sulfites, for example, ammonium peroxydisulfate and ammonium disulfite. The ratio of peroxide-containing compound to redox co-initiator is typically from 30:1 to 0.05:1.

In the effective selection one or more thermal initiators, the thermal decomposition temperature of the selected initiator should correspond to the one or more polymerization temperatures. Thus, if the reaction mixture is initially polymerized partly at the lower limit of the temperature range appropriate for polymerization, and is then polymerized to completion, at a higher temperature, it is expedient to use at least two different initiators which decompose at different temperatures, so that there is sufficient concentration of free radicals available within each temperature range.

In combination with the initiators, it is possible to use, in addition, transition metal catalysts, such as salts of iron, cobalt, nickel, copper, vanadium, and manganese. Suitable salts include, for example, iron (II) sulfate, cobalt (II) chloride, nickel (II) sulfate, and copper (I) chloride. The reductive transition metal salt may be used in a concentration of from 0.1 to 1,000 ppm, based on the monomers in the curable composition.

Preferably, the addition (co)polymer may be polymerized in the presence of one or more chain transfer agents to prepare (co)polymers of low average molecular weight. Customary regulators may be used, for example, organic compounds containing SH groups, such as 2-mercaptoethanol, 2-mercaptopropanol, mercaptoacetic acid or esters thereof, mercaptopropionic acid or esters thereof, tert-butylmercaptan, n-octylmercaptan, n-dodecylmercaptan, and tert-dodecymercaptan; $C_1$-$C_4$ aldehydes, such as acetaldehyde, propionaldehyde; hydroxylammonium salts, such as hydroxylammonium sulfate; formic acid; sodium bisulfite or isopropanol. The addition (co)polymer may be formed in the presence of a phosphorous-containing regulator, such as, for example, hypophosphorous acid and its salts, e.g. sodium hypophosphite, as is disclosed in U.S. Pat. No. 5,294,686, so as to incorporate the optional phosphorous-containing species in the polyacid (co)polymer molecule. The regulators are generally used in amounts of from 0 to 40 weight percent, preferably from 0 to 15 weight percent, based on the weight of the monomers in the curable composition.

The addition (co)polymers can be prepared in water or in solvent/water mixtures such as, for example, i-propanol/water, tetrahydrofuran/water, and dioxane/water.

The preferred method of polymerization is by gradual addition solution polymerization in water. In this method, part, or all of the ethylenically unsaturated (co)monomer or monomer mixture can be metered into the reactor. The manner in which the (co)monomers may be fed to a reaction container or vessel may vary. No matter the method of polymerization, the preferred total feed time, i.e. the time required to feed all of the reaction mixture into the reaction container, may range 2 hours or less, more preferably, 1 hour or less.

In one embodiment of the method of polymerization, the composition of the monomer feeds remains substantially the same throughout the polymerization process. Alternatively, to limit the gel content of any addition (co)polymerization product, the comonomer feed composition may be adjusted during the duration of the raw material feeds. In yet another embodiment, the method of polymerization, the (co)monomers or mixtures thereof may be fed by a semi-continuous feed. In the preferred methods of polymerization of the addition (co)polymer, the reaction container contains an initial charge of a reaction mixture comprising 10 wt. % or more of the total amount of chain transfer agent used, and a single constant feed of the remainder of the chain transfer agent is fed continuously from a monomer vessel into the reaction container.

To improve solubility in aqueous media, the carboxylic acid groups, anhydride groups, or salts thereof of the one or more addition (co)polymer may be neutralized with one or more fixed or volatile base. Preferably, the carboxylic acid groups, anhydride groups, or salts of the addition (co)polymer may be neutralized with a volatile base. By "volatile base" is meant herein one or more base which is substantially volatile under the conditions of treatment of the substrate with the curable composition. By "fixed" base is meant herein, a base which is substantially non-volatile under the conditions of treatment of the substrate with the curable composition.

Use of volatile bases permits curing of the binder composition without a strong acid catalyst, where such curing is possible. Suitable volatile bases include, for example, ammonia or volatile lower alkyl amines. Suitable fixed bases include, for example, sodium hydroxide, potassium hydroxide, sodium carbonate, and t-butylammonium hydroxide. The fixed base is sufficiently nonvolatile that it will substantially remain in the curable composition during heating and curing operation. The volatile base can be used in addition to the fixed base. Fixed multivalent bases such as, for example, calcium carbonate, may tend to destabilize aqueous dispersions if the copolymer component is used in the form of an aqueous dispersion, however, they can be used in minor amounts.

The amount of one or more base utilized may be such that the carboxylic acid groups, anhydride groups, or salts thereof of the addition (co)polymer are neutralized to an extent of less than 35%, or less than 20%, or less than 5%, calculated on an equivalents basis. It is preferred not to use any neutralizing base.

The one or more polyol (ii) preferably contains three or more hydroxyl groups, i.e. is a trihydric polyol; however it may contain two hydroxyl groups. The polyol must be sufficiently nonvolatile that it will substantially remain available for reaction with the polyacid in the composition during heating and curing operations. The polyol may be one or more compound having a formula molecular weight of less than about 1000 bearing at least two hydroxyl groups chosen from, for example, (poly)ethylene glycol, diethanolamine (DEOA), glycollated ureas, 1,4-cyclohexane diol, resorcinol, catechol, and $C_3$ to $C_8$ (poly)alkylene glycols; one or more trihydric polyols which contain three or more hydroxyl groups, such as glycerol, trimethanol propane (TMP), trimethanolethane, pentaerythritol, sorbitol, triethanolamine (TEOA), 1,2,4-butanetriol, poly(vinyl alcohol), partially hydrolyzed poly(vinylacetate), sorbitol, sucrose, glucose, pyrogallol, propoxylated trimethylol propane, propoxylated pentaerythritol, β-hydroxyamides of the following Formula (III)

(III)

in which formula, R and R″ independently represent H, or monovalent $C_1$ to $C_{18}$ linear or branched alkyl radicals which may contain aryl, cycloalkyl and alkenyl groups; R′ represents a divalent $C_1$ to $C_5$ alkylene radical or a covalent bond; y is the integer 1, 2, or 3; x is 1 or 2, such that (x+y)=2 or 3; and mixtures thereof. Other suitable trihydric polyols having at least three hydroxyl groups may comprise reactive polyols such as, for example, β-hydroxyalkylamides such as, for example, bis-[N,N-di(β-hydroxyethyl)]adipamide, as may be prepared according to the teachings of U.S. Pat. No. 4,076,917; addition (co)polymers containing at least two hydroxyl groups such as, for example, polyvinyl alcohol, partially hydrolyzed polyvinyl acetate, and addition homopolymers or copolymers comprising the polymerization product of hydroxyl group containing monomers; or mixtures and combinations thereof. Further, the polyol may comprise the one or more polymeric polyacid of the present invention, wherein the polymeric polyacid comprises the polymerization product of one or more ethylenically unsaturated carboxylic acids and one or more hydroxyl group containing monomers, such as the monomers of formula (I) or (II), above. Preferably, the one or more polyol comprises a trihydric polyol or a dihydric polyol of formula (III). Preferred trihydric alcohols are glycerol, TEOA, TMP, trihydric β-hydroxyamides of formula (III), and mixtures thereof.

The one or more reactive waterproofing agent (iii) may comprise the mono- or di-hydroxyethyl amide, formed by amidation with alkanolamines of any $C_5$ to $C_{30}$ alk(en)yl group containing acids, esters or glycerides; the amine formed by reaction of alkanolamines with $C_5$ to $C_{30}$ alk(en)yl group containing alcohols; the ester formed by reaction of $C_5$ to $C_{30}$ alk(en)yl group containing carboxylic acids with trihydric polyols, e.g. glycerol or (poly)ethoxylated glycerol to yield monoglycerides; the amines formed by reaction of $C_5$ to $C_{30}$ alk(en)yl alcohols, amides or acids with one or more (poly)alkoxylated amine or alkylene diamine, or the amines formed by reaction of ether or thioether containing $C_5$ to $C_{30}$ alk(en)yl alcohols, amides or acids with one or more (poly) alkoxylated amine or alkylene diamine. Especially preferred acid, glyceride or alcohol reactants are those $C_5$ to $C_{30}$ alk(en) yl monocarboxylic acids, monoglycerides, or alcohols from vegetable or plant oils. Suitable sources of one or more $C_5$ to $C_{30}$ alk(en)yl acid, monoglyceride or alcohol may comprise, for example, natural oils of coconut, canola, corn, olive, flax, grapeseed, hemp, palm fruit, peanut, safflower, soybean, sunflower, as well as beef tallow, fish oil or chicken fat, and mixtures thereof. Additionally, suitable synthetic alk(en)yl acids or alcohols may comprise, for example, lauric, oleic, stearic, linoleic, linolenic, undecyl(en)ic acids or alcohols. To make the waterproofing agents, the $C_5$ to $C_{30}$ acids, alcohols or glycerides may be reacted with any of a mono-, di-, or tri-ethanoloamine, mono-, di-, or tri-isopropanolamine, or $C_1$ to $C_{18}$ alk(en)yl substituted mono-, di-, or tri-ethanolamine, including quaternaries of TEOA, with heating, with constant removal of water preferably in the presence of a catalyst. Preferably, the reactive waterproofing agents comprise one or more $C_8$ to $C_{18}$ alk(en)yl diethanol amide, $C_8$ to $C_{18}$ alk(en)yl monoglyceride or monocarboxylate of a trihydric polyol, $C_{11}$ to $C_{16}$ alk(en)yl diethanol amine, $C_8$ to $C_{18}$ alk(en)yl monocarboxylate of a (poly)alkoxylated trihydric polyol, $C_8$ to $C_{18}$ alk(en)ylamine (poly)alkoxylate, such as ethoxylated cocamine or tallow amine, $C_8$ to $C_{18}$ alk(en)yl diamine (poly) alkoxylate, such as ethoxylated tallow aminopropylamine, or $C_8$ to $C_{18}$ alk(en)ylamine (poly)alkoxylate containing an ether or thiother group in the alk(en)ylamine group. Unsaturation functionality in the hydrophobic $C_5$ to $C_{30}$ chain of the reactive waterproofing agent may aid in curing binders comprising polyacid addition (co)polymers. Examples of preferred reactive waterproofing agents cocamide DEA (diethanolamide) or N,N-bis (2-hydroxyethyl) cocamide, cocamide MEA (monoethanolamide) or N-(2-hydroxyethyl) cocamide, lauramide MEA, coco monoglyceride, glycereth cocoate, lauramide MEA, cocamine DEA, lauramine DEA, oleic DEA, and canolamide DEA. A suitable Cocamide DEA includes NINOL™ 40-CO available from Stepan Company, Northfield, Ill., and linoleic DEA. Suitable ethoxylated fatty amines include, for example, ethoxylated cocamines available as Ethomeen® C/12 or Ethomeen® C/15 available from Akzo Nobel Chemicals Inc., Arnhem, Netherlands, ethoxylated tallow amine, available as TOXIMUL™ from Stepan Company, Northfield, Ill., or glycereth-2 cocoate available as LEVENOL™ H&B from Kao Corp., Tokyo, Japan.

Suitable amounts of the reactive waterproofing agent (iii) may range up to 20 wt. %, based on the total weight of binder solids, or, preferably, up to 10 wt. %, or up to 5 wt. %; and the waterproofing agents may be used in amounts of 0.1 wt. % or more, based on the total weight of binder solids, preferably, 1 wt. % or more, more preferably 2 wt. % or more. Accordingly, because no emulsion copolymer is used for waterproofing, the present invention enables waterproofing of substrates treated with curable compositions having a total amount less than 10 wt. % of waterproofing agent, including emulsion (co)polymers, e.g. those comprising the reaction product of 20 wt. % or less, based on total monomers, of acid, anhydride or salt containing monomers.

In one embodiment, the curable compositions comprise (ii) one or more polyol comprising at least two hydroxyl groups, (iii) one or more reactive waterproofing agent chosen from a $C_8$ to $C_{18}$ alk(en)ylamine (poly)alkoxylate, a (poly)alkoxylated $C_8$ to $C_{18}$ alk(en)yl diamine, a $C_8$ to $C_{18}$ alk(en)ylamine (poly)alkoxylate having an ether or thiother group in the alk(en)ylamine, a $C_8$ to $C_{18}$ alk(en)yl monocarboxylate of a (poly)ethoxylated trihydric polyol, or mixtures thereof, and (i) one or more polyacid is chosen from polyester containing at least two carboxylic acid groups, a polybasic acid, a polybasic acid salt, a polybasic anhydride, an oligomer of a polybasic acid, a salt of an oligomer of a polybasic acid, an oligomer of a polybasic anyhydride, polymeric polyacids formed by polymerizing at least one ethylenically unsaturated carboxylic acid-functional monomer reactant in the amount of more than 25 wt. %, based on the total weight of the monomer reactants in the polyacid, polymeric polyacids formed by polymerizing at least one ethylenically unsaturated carboxylic anhydride-functional monomer reactant in the amount of more than 20 wt. %, based on the total weight of the monomer reactants in the polyacid, and salts thereof. Such compositions provide coatings having enhanced burnishing resistance because, unlike an emulsion (co)polymer or latex, the polyacid will not displace polyol or other acid in the aqueous phase whereby the composition provides improved crosslinking density and cure strength, for example, in cured coatings on fiberglass insulation.

To improve the compatibility of the reactive waterproofing agent (iii) with the remainder of the curable compositions, and/or to further enhance waterproofing, the compositions of the present invention may additionally contain reactive amphiphilic polyols, such as $C_5$ to $C_{30}$ alkanol (poly)alkoxylates, trihydric polyol (poly)alkoxylates, trihydric polyol monoesters of $C_5$ to $C_{30}$ dicarboxylic acids, or $C_5$ to $C_{30}$ alkylene glycols, in the amount of up to 20 wt. %, based on the total weight of binder solids, or, preferably, up to 10 wt. %, or up to 5 wt. %, or up to 3 wt. %; reactive amphiphilic polyols may preferably be used in the amount of 0.1 wt. % or more, or 1.0 wt. % or more, based on the total weight of binder solids. Examples of suitable trihydric reactive amphiphilic polyols may comprise (poly)propoxylated pentaerythritol, available as POLYOL PS 50 from Perstorp Specialty Chemicals, Perstorp, Sweden, or (poly)propoxylated TMP, available as POLYOL TS 30 from Perstorp Specialty Chemicals, Perstorp, Sweden, and pentaerythritol or TMP monocaprylate. Examples of suitable dihydric reactive amphiphilic polyols may include $C_8$ to $C_{18}$ alkanol (poly)ethoxylates or (poly)propoxylates, fatty alcohol (poly)ethoxylates or (poly)propoxylates, ethoxylated linear $C_9$ to $C_{16}$ alkanols, available as TOMADOL™ from Tomah Products, Inc., Milton, Wis., castor oil ethoxylates or propoxylates and hexylene glycol.

The ratio of the number of equivalents of carboxy, anhydride, or salts thereof in the curable compositions, i.e. the one or more polyacid (i), to the total number of equivalents of hydroxyl in the polyol (ii), the reactive waterproofing agent (iii) and any reactive amphiphilic polyol, is from about 1/0.01 to about 1/3, preferably 1/0.2 or more, and may range as high as 1/1. To avoid an excess of volatile organic compounds (VOC's) and insure formation of a good cure network, an excess of equivalents of carboxy, anhydride, or salts thereof to the equivalents of hydroxyl in the curable compositions is preferred. To insure formation of a good network in the cured composition, the preferred ratio of the number of equivalents of carboxy, anhydride, or salts thereof to the number of equivalents of hydroxyl in the curable compositions is preferably 1/0.2 or less. The most preferred ratio of the number of equivalents of carboxy, anhydride, or salts thereof to the number of equivalents of hydroxyl in the polyol is from about 1/0.2 to about 1/0.8.

Preferably, the curable aqueous composition also contains one or more phosphorous-containing accelerator which may be a compound such as those disclosed in U.S. Pat. No. 6,136,916. Preferably, the accelerator is selected from the group consisting of sodium hypophosphite, sodium phosphite, or a mixture thereof. The phosphorous-containing accelerator can also be one or more (co)oligomer bearing phosphorous-containing groups added to the curable compositions, for example, a (co) oligomer of acrylic acid formed in the presence of sodium hypophosphite by addition polymerization. Further, the one or more phosphorous-containing accelerator may comprise part of the polyacid (i) as an oligomer or (co)polymer bearing phosphorous-containing groups such as, for example, addition (co)polymers of acrylic and/or maleic acids and, optionally, ethylenically unsaturated comonomers, e.g. those having a solubility of less than 2 g/100 g of water at 25° C., or combinations thereof, formed in the presence of sodium hypophosphite; polymeric polyacid addition copolymers comprising phosphorous-containing monomer residues such as, for example, copolymerized phosphoethyl methacrylate and like phosphonic acid esters, and their salts. The one or more phosphorous-containing accelerator may be used at a level of from 0 wt. % to 40 wt. %, based on the combined weight of the polyacid and the polyol. The phosphorous-containing accelerators may be used in the amount of 0.1 wt. % or more, based on the total weight of binder solids, and up to 25 wt. %, or up to 20 wt. %, or, preferably, up to 15 wt. %, and, more preferably, up to 12 wt. %. When the phosphorous-containing accelerator comprises part of an addition (co)polymer, the wt. % of the phosphorous-containing accelerator is based on/determined by wt % of hypophosphite, phosphinate or phosphonate charged to the reactor as a fraction of the total batch solids.

In curable compositions wherein the polyol (ii) comprises from 0.1 to 10 wt. %, preferably 0.5 to 5 wt. %, based on the total weight of binder solids, of one or more β-hydroxyalkyldiamides, such as bis-[N,N-di(β-hydroxyethyl)]adipamide, or polymeric di(β-hydroxyethyl) amides as may be prepared according to the teachings of U.S. Pat. No. 4,076,917, no phosphorous-containing accelerator or strong acid catalyst is used.

In one embodiment of the invention, the curable composition comprises one or more strong acid catalyst and has a low pH of ≦4.5, preferably ≦3.5, more preferably 2.5 or less, and even more preferably 2.1 to 2.3. Any pH value below 2.0 may require special department of transportation (DOT) considerations which may impact cost. The low pH may be obtained, for example, by adding on or more suitable acid, preferably a mineral acid to the curable composition. The mineral acid may be added either the point of application or manufacturing of the binder. The mineral acid, may be sulfuric or nitric acid. Other suitable acids may be organic acids, such as, for example carboxylic and sulfonic acids, as in p-toluene sulfonic acid. When a low pH curable composition is utilized, it is preferred that the addition (co)polymer have a low molecular weight of preferably less than 10,000, more preferably less than 5,000, and even more preferably around 3,000 or less, with about 2,000 being advantageous.

If the curable composition comprises strong acid esterifying catalysts (with a pKa of ≦3.0), the carboxylic acid groups, anhydride groups, or salts of the addition (co)polymer may be neutralized. It is preferred that the neutralizing base is fugitive. In regard to equivalents basis, when the half ester of a dicarboxylic acid, or the anhydride of a dicarboxylic acid is used, the equivalents of acid are calculated to be equal to those of the corresponding dicarboxylic acid.

The curable composition may be prepared by admixing the one or more polyacid, the one or more polyol, the one or more waterproofing agent, and, if desired, the one or more phosphorous-containing accelerator and any additional ingredients using conventional mixing techniques. Optionally, one or more low molecular weight polybasic carboxylic acid, anhydride or salt thereof may be mixed with one or more polyol (ii), under reactive conditions, prior to mixing with one or more polyacid (i) (co)polymer. Water may be admixed with the remainder of the composition at the point of use, and not before, to minimize shipping weight. The total solids of the curable compositions of the present invention may range up to 100 wt. %, based on the total weight of the composition, as in with an anhydrous and solvent free or a dried binder composition, or up to 70 wt. %, as is the case with solutions or dispersions, or up to 60 wt. %, or up to 50 wt. %; such total solids may range as low as 0.5 wt. % or more, or 1 wt. % or more, or 3 wt. % or more, or 5 wt. % or more. The total solids of the curable compositions may be selected to provide compositions having a suitable viscosity for various means of treating substrates. For example, sprayable curable compositions may have a total solids of 5 wt. %. However, substrates may be dipped in or themselves contacted with curable compositions having a total solids of 10 wt. % or more. As used herein, the term "total solids" refers to the sum of the total amount of binder solids, plus any fillers or extenders.

In one embodiment, the one or more polyacid (i) is an addition copolymer comprising one or more polyol (ii) present in the same addition copolymer. In another embodiment, the one or more salts of the carboxyl groups in the one or more polyacid (i) are salts of functional alkanolamines with at least two hydroxyl groups such as, for example, diethanolamine, triethanolamine, dipropanolamine, and diisopropanolamine, preferably, triethanolamine. In yet another embodiment, the one or more polyol (ii) and the one or more phosphorous-containing accelerator may be present in the same addition copolymer, which addition polymer may be mixed with one or more polyacid (i). In yet even another embodiment, the one or more polyacid (i), the one or more polyol (ii), and the one or more phosphorous-containing accelerator may be present in the same addition copolymer. In such embodiments, the curable composition may be prepared by mixing the addition (co)polymer, the one or more reactive waterproofing agent, and, optionally, phosphorous-containing accelerators, any additional polyols, and/or other ingredients using conventional mixing techniques.

The curable compositions may further contain conventional additives which can be added at any time. Suitable additives include one or more of each of an emulsifier; a pigment; a filler or extender, used in the amount of up to 40 wt. %, based on the total weight of binder solids; an anti-migration aid; a curing agent, e.g. urethanes, aldehyde condensates and aminoplasts, and epoxy resins, such as bisphenol epoxy resins; a coalescent; an anionic or a nonionic surfactant, including anionic phosphonates, maleates, sulfinates, and dodecyl benzene sulfonic acid (DDBSA), preferably nonionic surfactants having an HLB of 5-25 and non-aromatic sulfonates, used in the amount of 0.01 to 5 wt. %, based on the total weight of binder solids; a spreading agent; a dust suppressing agent; a biocide; a plasticizer; a coupling agent; an anti-foaming agent; a corrosion inhibitor, particularly corrosion inhibitors and anti-oxidants effective at pH≦4 such as thioureas, oxalates, and chromates, e.g. tin oxalate; a colorant; an antistatic agent; a lubricant; and a wax.

Suitable fillers or extenders may comprise microcrystalline silicas, including cristobalite or christobalite and tridymite, kaolin, bentonite, calcined aluminum silicate, wollastonite, calcium metasilicate, alkali aluminum silicate, diatomaceous silica, ground glass, nepheline syenite, hydrotalcite, mica, smectites, such as layered clays and phyllosilicates, including montmorillonite, bentonite, saponite, beidellite, montronite, hectorite, and stevensite, vermiculite, anhydrous aluminosilicate clay delaminated, titanium dioxide, zinc oxide, calcined clay and calcined silicates, such as calcined aluminum silicates and mixtures thereof. Kaolin clay, smectites or phyllosilicates may or may not be surface treated to render them hydrophobic, such as with trialkylarylammonium compounds.

To facilitate spray application of the curable compositions on heat resistant non-woven fibers, e.g. glass wool or mineral wool, the compositions may additionally comprise one or more anti-foaming agent. Preferably, the anti-foaming agent is all organic and is silicone-free, thereby reducing cost and minimizing burnishing of the composition from any substrate. Suitable anti-foaming agents may include ethoxylated nonionics and hydrophobe-hydrophile-hydrophobe block copolymers, such as associative thickeners, each on the amount of from 0.001 to 5 wt. %, based on the total weight of binder solids. Suitable anti-foaming agents sell under the trade name FOAM BLAST™ (Lubrizol Corporation, Milwaukee, Wis.) and D-FOAM™ (D-Foam, Incorporated Weatherford, Tex.), and TEGO™ (Degussa, Corporation, Parsippany, N.J.). Preferred anti-foaming agents may include the β-hydroxyamides from lactones of formula (III) in the amount of up to 10 wt. % or more, based on the total weight of binder solids, or up to 5 wt. %, or up to 3 wt. % or up to 1 wt. %, or in the amount of 0.1 wt. % or more, or 0.5 wt. % or more.

Preferably, curable compositions for treating glass substrates comprise coupling agents, such as silanes, particularly hydrolyzable oxysilanes like 3-glycidoxypropyltrialkoxysilane, aminopropyltri(m)ethoxy silane, for example, the γ-glycidoxypropyltrimethoxysilane compounds available as SILQUEST™ A-187 (OSi Specialties Inc., Wilton, Conn.). Such coupling agents may be used in the amount of 0.1 wt. % or more, based on the total weight of binder solids, or 0.2 wt. % or more, or 0.5 wt. % or more, and such amounts may range up to 5 wt. %, or up to 2 wt. %, or up to 1.5 wt. % based on binder solids.

Preferably, to promote surface coverage, one or more surfactants or emulsifiers are added to the curable compositions immediately after the binder solids are admixed together. The one or more surfactants or emulsifiers help to maintain aqueous homogeneity at higher total solids (>30%) and storage temperatures equal to or higher than room temperature. Suitable surfactants may include nonionics, sulfonates, sulfates, phosphonates phosphates, maleates. Particularly useful are non-silicone and acetylenic group containing surfactants such as SURFYNOL™ (Air Products and Chemicals, Inc., Allentown, Pa.) and TERGITOL™ (The Dow Chemical Company, Midland, Mich.), as well as ethoxylated fatty alcohols, such as NEODOL™ (Shell Chemicals,). Other formulation aids can be added to compatibilize the waterproofing agent with other components of the thermoset formulation. These can include reactive amphiphilic polyols, such as $C_6$ to $C_{12}$ glycols, e.g. hexylene glycol, and those polymeric materials described in U.S. Pat. No. 4,797,223.

For use on substrates containing fines or finely divided materials, one or more dust suppressing agents may desirably be added. Such dust suppressing agents may include hydrocarbons having carbon numbers predominantly higher than $C_{25}$ and boiling above approximately 400° C. (752° F.). These can include non smoking hydrocarbon emulsions such as MULREX™ non combustible oils (ExxonMobil Oil Corp., Fairfax, Va.) and Garo 217 (G.O.V.I., NV, Drongen, Belgium). Such dust suppressing agents can be added at any time. They can be added as an emulsified aqueous dispersion or directly without emulsification in the amount of from 1 to 5 wt. %, preferably up to 3.0 wt. %, based on total binder solids. High boiling hydrocarbons, commonly referred to as solvent refined oils, can be mechanically dispersed into a dilute aqueous binder formulation prior to application. If equipment constraints and costs permit, high boiling silicone oils and silicon emulsions can also be used to suppress glass particulates generated during processing.

The present invention provides methods for treating one or more substrates by forming the curable composition of the present invention, contacting the substrate with the curable composition or applying the curable composition to the substrate, and heating the curable composition at a temperature of from 100° C. to 400° C. to dry and cure the composition. The substrate may be contacted with the curable composition by methods commonly described as, for example, coating, e.g. dip coating, sizing, saturating, bonding, and combinations thereof. The curable composition can be applied to a substrate by conventional techniques such as, for example, air or airless spraying, padding, saturating, roll coating, curtain coating, beater deposition, or coagulation. Curable compositions comprising polyacid addition (co)polymers having a weight average molecular weight above 20,000 and having a high viscosity, e.g. $\leq 40$ centipoise at STP, may preferably be applied to fibrous and composite substrates by dip or roll coating. Curable compositions having a lower viscosity may be spray applied to substrates.

In drying and curing the curable compositions, the duration, and temperature of heating, will affect the rate of drying, ease of processing or handling, and property development of the treated substrate. Suitable heat treatment at 100° C. or more, and up to 400° C. may be maintained for from 3 seconds to 15 minutes. Preferably, heat treatment temperatures range 150° C. or higher; such preferred heat treatment temperatures may range up to 280° C., or, more preferably, up to 225° C.

Drying and curing can be effected in two or more distinct steps, if desired. For example, the curable composition can be first heated at temperatures and for times sufficient to substantially dry, but not to substantially cure the composition, followed by heating for a second time, at higher temperatures and/or for longer periods of time, to effect curing. Such procedures, referred to as "B-staging", can be used to provide binder-treated nonwovens, for example, in roll form, which can be cured later, with or without forming or molding into a particular configuration, concurrent with the curing process.

As polyacids (i) and polyacid polymers can be corrosive to certain types of processing equipment, particularly those made from soft steel, certain types of corrosion control may preferably be practiced when handling solutions containing such polyacids. These practices can include, for example, pH control, e.g. by using TEOA or basic polyols (ii), reducing use of or eliminating strong acids, reducing use of phosphorous-containing accelerators and polymers containing them, and using materials such as stainless steel in the process equipment itself instead of more corrosive material.

Suitable substrates may include, for example, fibers such as glass and mineral fibers; heat resistant woven and nonwoven fabrics, such as those comprising aramid fibers, ceramic fibers, metal fibers, carbon fibers, polyimide fibers, polyester fibers, rayon fibers, mineral fibers and glass fibers; finely divided or fibrous metal and heat-resistant plastic materials, e.g. poly(aromatic imides) or PVC. Suitable nonwoven fabric substrates may comprise fibers that have been consolidated by purely mechanical means such as, for example, by entanglement caused by needle-punching, by an air-laid process, or by a wet-laid process; by chemical means, such as, for example, treatment with a polymeric binder; or by a combination of mechanical and chemical means before, during, or after nonwoven fabric formation. Heat-resistant nonwovens may also contain fibers which are not in themselves heat-resistant such as, for example, polyester fibers, rayon fibers, nylon fibers, and superabsorbent fibers, in so far as or in amounts such that they do not materially adversely affect the performance of the substrate.

Suitable applications for the curable compositions of the present invention include, for example, nonwovens for use as insulation batts or rolls to be used in ovens and in building construction, as reinforcing mats for roofing or flooring applications, as roving, as microglass-based substrates for printed circuit boards, as battery separators, as filter stock, e.g. for air duct filters, as tape stock, as reinforcement scrim in cementitious and non-cementitious coatings for masonry, or as abrasives; wovens, nonwovens and composites for use as abrasives and stock or prepregs therefore, e.g. brake shoes and pads, clutch plates, or as sheets or panels, as in ceiling tiles; and mineral or glass fiber-containing heat-resistant nonwoven fabrics impregnated with hot asphaltic compositions, for example, at temperatures of from 150° C. to 250° C. to make roofing shingles or roll roofing materials.

The following non-limiting examples illustrate the curable aqueous composition and the use thereof as a binder for heat-resistant nonwovens.

EXPERIMENTAL

Production of Polyacid Addition (Co)Polymers

Polymer A: Poly(acrylic acid) homopolymer (pAA): 2-propenoic acid telomer with phosphinic acid monosodium salt (CAS# 73256-97-0) was prepared via gradual addition sodium hypophosphite chain transfer polymerization. To a 1892.5 liter (500 gallon) reactor equipped with each of a mechanical stirrer, condenser, thermometer and inlets for the gradual additions of monomer, initiator and sodium hypophosphite solutions, was added 645,000 grams of deionized (DI) water. The contents of the flask were heated to 90° C., and a solution of 48,375 grams of sodium hypophosphite monohydrate dissolved in 60,000 grams of DI water was added. A monomer charge of 1,075,000 grams of glacial acrylic acid was prepared. A chain regulator solution was prepared by dissolving 48,375 grams of sodium hypophosphite monohydrate in 60,000 grams of DI water. An initiator solution was prepared by dissolving 10,750 grams of sodium persulfate in 60,000 grams of DI water. The separate feeds of the monomer charge, the chain regulator solution, and the initiator solution into the heated stirring flask were begun simultaneously and were continued linearly and separately for 120 minutes, 95 minutes, and 120 minutes respectively, while maintaining the contents of the flask at 90° C. to 92° C. After the feeds were completed, the contents of the flask were maintained at 90° C. to 92° C. for 30 minutes. The resulting solution of poly(acrylic acid) had a solids content of 52.1 wt. %.

Polymer B: A Poly (acrylic acid 90/styrene 10): A copolymer of 90 parts by weight of acrylic acid and 10 parts by weight of styrene, based on the total weight of monomers, was prepared in 2 metered feed cycles via a gradual addition aqueous solution polymerization in the presence of 14 parts by weight, based on total monomer weight, of sodium hypophosphite, a chain transfer agent. The copolymer, constitutes copolymerized monomers and chain transfer agent residues, solids content of 40.35 wt. %.

EXAMPLES 1-45

Treatment of Glass Microfiber Filter Paper and Tensile Testing of Treated Substrate Curable compositions were prepared by admixing Polymers A or B, made as described above, with a trihydric alcohol with the reactive waterproofing agent in the proportions given in TABLE 2, and water to provide an approximately 5 weight % aqueous binder solution. The pH of the aqueous dispersions or solutions were adjusted with mineral acid to a pH of 3.

A binder impregnated microfiber filter, (Whatman International Inc., Maidstone, England, GF/A, catalog No. 1820 866), in 20.3 cm×25.4 cm sheets was prepared by drawing a filter sheet through a trough filled with 300 grams of a 5.5 weight % pre-mixed aqueous binder solution that has been further mixed by agitation, sandwiching the soaked sample between two cardboard sheets to absorb excess binder, and pressing between the two cardboard sheets in a with a Birch Bros. Padder, 68.9476 kPa/speed 5 m/min. The resulting samples are dried @ 90° C. for 1.5 min in a Mathis Oven that is vented or equipped with a devolatilizer. Post drying weight was determined to calculate binder add-on (dry binder weight as a percentage of filter paper weight.) All sheets had about 11% of binder add-on. "Add on" is the wt. % based on filter sheet weight of binder solids retained on the filter sheet after initial drying and before curing. The dried sheets were then cured at 190° C. for 180 seconds in the same type of Mathis oven used to dry the samples.

The dried and cured sheets were cut in half and each sheet was challenged with droplets of water applied carefully by pipette in a 3×3 two dimensional grid. The waterproofing of various binders was thereby tested according to a qualitative Waterproofing Rating System, as set forth in TABLE 1, below, which is based on the time it takes for wet out to occur. As used herein, the phrase "wet out" means water is adsorbed into substrate.

TABLE 1

| Water Repellency Rating | Requirements |
|---|---|
| 1 | Poor/wets out on filter paper immediately |
| 2 | Poor/wets out of filter paper after 10–15 seconds |

TABLE 1-continued

| Water Repellency Rating | Requirements |
|---|---|
| 3 | Moderate/wets out on filter paper after 45–60 seconds |
| 4 | Good/wets out on filter paper after 120–180 seconds |
| 5 | Excellent/15 minutes plus |

As can be seen from the Table 2, below, cocamide DEA (Examples 3-5, 8-9 and 17-18) and pentaerythrit monocaprylate (Example 20) provide excellent wet out resistance at amounts of from 2 to 10 wt. %, based on the total weight of binder solids. Likewise, Lauryl DEOA provided excellent wet out resistance at amounts of from 1 to 2 wt. % based on the total weight of binder solids (Examples 10-12). The excellent wet out resistance is comparable to non-reactive emulsified silicone oil uses at 2 wt. %, based on the total weight of binder solids (Comparative Example 6). A $C_4$ alkyl N,N-bis (2-hydroxyethyl) amide does not provide good wet out resistance, even used in amounts of 3 and 5 wt. %, based on the total weight of binder solids (Comparative Examples 13 and 14). Without waterproofing agents, the p(co)AA curable binder compositions only provide poor wet out resistance (Comparative Example 7).

As can be seen from Table 3, below, in Examples 21 and 24-27, as little as 0.5 to 3 wt. % of a dodecylamine ethoxylate in the curable compositions of the present invention provides excellent wet out resistance. Likewise, as shown by Examples 44 and 45, as little as 2 wt. % of PEG-3 tallow aminopropylamine in the curable compositions of the present invention provides excellent wet out resistance. Examples 33, 39 and 42 show that 5 wt. % of either an ether containing $C_{18}$ diamine ethoxylate or a $C_{18}$ diamine ethoxylate in the curable compositions of the present invention provides excellent wet out resistance.

TABLE 2

Water Repellency Test Results

| EXAMPLE | Polyacid (i) | Polyol (ii) | Ratio of equiv. OH from (ii) to equiv. carboxylic acid from (i) | Reactive Waterproofing Agent (WA) | WA Wt. %, Based On Total Wt. Of Binder Solids | Waterproofing Rating |
|---|---|---|---|---|---|---|
| 1 Comparative | Polymer A | TEOA | 0.55 | None | 0 | 1 |
| 2 | Polymer A | TEOA | 0.55 | [1]NINOL ™ 40-CO | 1 | 3 |
| 3 | Polymer A | TEOA | 0.55 | [1]NINOL ™ 40-CO | 2 | 5 |
| 4 | Polymer A | TEOA | 0.55 | [1]NINOL ™ 40-CO | 5 | 5 |
| 5 | Polymer A | TEOA | 0.55 | [1]NINOL ™ 40-CO | 10 | 5 |
| 6 | Polymer A | TEOA | 0.55 | Emulsified silicone oil | 2 | 5 |
| 7 Comparative | Polymer B | TEOA | 0.55 | None | 0 | 2 |
| 8 | Polymer B | TEOA | 0.55 | [1]NINOL ™ 40-CO | 5 | 5 |
| 9 | Polymer B | TEOA | 0.55 | [1]NINOL ™ 40-CO | 10 | 5 |
| 10 | Polymer A | TEOA | 0.55 | [2]N-lauryl DEOA | 2 | 5 |
| 11 | Polymer A | TEOA | 0.55 | [2]N-lauryl DEOA | 1 | 5 |
| 12 | Polymer A | TEOA | 0.55 | [2]N-lauryl DEOA | 0.5 | 3 |
| 13 Comparative | Polymer A | TEOA | 0.55 | [3]N-butyl DEOA | 3 | 1 |
| 14 Comparative | Polymer A | TEOA | 0.55 | [3]N-butyl DEOA | 5 | 1 |
| 15 | Polymer A | TEOA | 0.55 | [4]NINOL ™ 5024 | 2 | 5 |
| 16 | Polymer A | TEOA | 0.55 | [5]NINOL ™ 1281 | 2 | 5 |
| 17 | Polymer A | TEOA | 0.55 | [6]NINOL ™ 11-CM | 2 | 5 |

TABLE 2-continued

Water Repellency Test Results

| EXAMPLE | Polyacid (i) | Polyol (ii) | Ratio of equiv. OH from (ii) to equiv. carboxylic acid from (i) | Reactive Waterproofing Agent (WA) | WA Wt. %, Based On Total Wt. Of Binder Solids | Waterproofing Rating |
|---|---|---|---|---|---|---|
| 18 | Polymer A | Glycerol | 0.75 | [7]NINOL ™ CMP | 2 | 4 |
| 19 | Polymer A | Glycerol | 0.75 | glyceryl monolaurate | 10 | 4 |
| 20 | Polymer A | Glycerol | 0.75 | pentaerythritol monocaprylate | 5 | 5 |

[1]Cocamide DEA, Stepan Company, Northfield, IL
[2]N-lauryl DEOA = n-lauryl diethanolamine
[3]N-butyl DEOA = n-butyl diethanolamine
[4]Mixed fatty acid DEA, Stepan Company, Northfield, IL
[5]Fatty acid alkylolamide, Stepan Company, Northfield, IL
[6]Modified cocamide DEA, Stepan Company, Northfield, IL
[7]Cocamide MEA, Stepan Company, Northfield, IL

TABLE 3

Water Repellency Test Results With (Poly)alkoxylated Reactive Water Proofing Agents

| EXAMPLE | Polyacid (i) | Polyol (ii) | Ratio of equiv. OH from (ii) to equiv. carboxylic acid from (i) | Reactive Waterproofing Agent (WA) | WA Wt. %, based on total Wt. of Binder Solids | Waterproofing Rating |
|---|---|---|---|---|---|---|
| 21 | Polymer A | TEOA | 0.55 | Noramox C2[1] | 2 | 5 |
| 22 | Polymer A | TEOA | 0.55 | Noramox C5[2] | 35 | 4 |
| 23 | Polymer A | TEOA | 0.55 | Noramox C11[3] | 5 | 4 |
| 24 | Polymer A | TEOA | 0.55 | Noramox O5[4] | 2 | 5 |
| 25 | Polymer A | TEOA | 0.55 | Chemeen C5[2] | 0.5 | 5 |
| 26 | Polymer A | TEOA | 0.55 | Chemeen C5[2] | 1 | 5 |
| 27 | Polymer A | TEOA | 0.55 | Chemeen C5[2] | 3 | 5 |
| 28 | Polymer A | TEOA | 0.55 | Tomah E-14-5[5] | 40 | 1 |
| 29 | Polymer A | TEOA | 0.55 | Tomah E-14-5[5] | 2 | 4 |
| 30 | Polymer A | TEOA | 0.55 | Tomah E-14-5[5] | 5 | 4+ |
| 31 | Polymer A | glycerol | 0.75 | Tomah E-14-5[5] | 1 | 2 |
| 32 | Polymer A | glycerol | 0.75 | Tomah E-14-5[5] | 2 | 3 |
| 33 | Polymer A | glycerol | 0.75 | Tomah E-14-5[5] | 5 | 5 |
| 34 | Polymer A | glycerol | 0.75 | Tomah E-DT-3[6] | 45 | 1 |
| 35 | Polymer A | glycerol | 0.75 | Tomah E-DT-3[6] | 2 | 1 |
| 36 | Polymer A | glycerol | 0.75 | Tomah E-DT-3[6] | 5 | 2 |
| 37 | Polymer A | TEOA | 0.55 | Tomah E-T-5[7] | 1 | 1 |
| 38 | Polymer A | TEOA | 0.55 | Tomah E-T-5[7] | 2 | 5 |
| 39 | Polymer A | TEOA | 0.55 | Tomah E-T-5[7] | 5 | 5 |
| 40 | Polymer A | glycerol | 0.75 | Tomah E-T-5[7] | 50 | 3 |
| 41 | Polymer A | glycerol | 0.75 | Tomah E-T-5[7] | 2 | 3+ |
| 42 | Polymer A | glycerol | 0.75 | Tomah E-T-5[7] | 5 | 5 |
| 43 | Polymer A | TEOA | 0.55 | Ethoduomeen T/3[8] | 1 | 1 |
| 44 | Polymer A | TEOA | 0.55 | Ethoduomeen T/3[8] | 2 | 5 |
| 45 | Polymer A | TEOA | 0.55 | Ethoduomeen T/3[8] | 5 | 5 |

[1]Di-N,N-ethoxylated dodecylamine containing an average total of two oxyethylene groups (CAS# 61791-14-8), Ceca Arkema, Paris, France
[2]Di-N,N-ethoxylated dodecylamine containing an average total of five oxyethylene groups (CAS# 61791-14-8), Ceca Arkema, Paris, France
[3]Di-N,N-ethoxylated dodecylamine containing an average total of eleven oxyethylene groups, Ceca Arkema, Paris, France
[4]Di-N,N-ethoxylated oleylamine containing an average total of five oxyethylene groups, Ceca Arkema, Paris, France
[5]Di-N,N-ethoxylated isodecyloxypropylamine containing an average total of five oxyethylene groups, Tomah Products, Inc., Milton, WI
[6]PEG-3 tallow aminopropylamine amine, Tomah Products, Inc., Milton, WI
[7]Di-N,N-ethoxylated octadecylamine containing an average total of five oxyethylene groups, Tomah Products, Inc., Milton, WI
[8]PEG-3 tallow aminopropylamine (CAS# 61790-85-0), Akzo Nobel, Arnhem, Netherlands

EXAMPLES 46-51

Contact Angle as a Measure of Waterproofing

In the following examples, a Kruss G10 instrument equipped with a camera and magnification capabilities was used to measure contact angle of the liquid-solids interface. The system was calibrated according to manufacturers standard operating procedure. Glass microfiber filter paper sheets (20.3×25.4 cm, Cat No. 1820 866, Whatman International Ltd., Maidstone, England) were treated with curable compositions as set forth in TABLE 4, below, followed by the drying and curing of the compositions as described in the treatment of glass microfiber filter paper, Examples 1-45, above. One Milli-Q droplet of water was placed on each treated substrate, and the contact angle was measured at approximately 0 minutes, 3 minutes, 5 minutes and 15 minutes after placement of water on the substrate.

To test burnished treated samples, each sample strip (with dimensions of approximately 10 mm wide by 15 mm long) was rubbed going in the direction of the grain with a new cotton swab for 30 seconds applying medium pressure prior to measuring the contact angle. To measure the contact angle, under conditions of room temperature, one Milli-Q droplet of water was placed on each treated substrate, and the contact angle was measured at approximately 0 minutes, 3 minutes, 5 minutes and 15 minutes after placement of water on the substrate. As used herein, the phrase "contact angle" refers to the tangent to droplet where it meets substrate).

In Table 4, below, Binder composition A comprises Polymer A (pAA) and TEOA in an equivalent Ratio of OH equivalents to carboxylic acid equivalents of 0.55. As can be seen from the results in Table 4, comparing Examples 20, 21 and 22 with Example 19, the waterproofing agents of the present invention perform as well as Dimethicone. However, when the substrates are burnished or abraded, the waterproofing agents of the present invention (Example 49) perform far better than the non-reactive Dimethicone (Example 48).

TABLE 3

Contact Angle Measurements

| EXAMPLE | Binder Composition | WA (wt. % based on total binder solids) | Time Water is Present on Treated Substrate | Contact Angle |
|---|---|---|---|---|
| 46 | A | [1]Dimethicone | 0 minutes | L 139.2° R 139.2° |
| | | | 15 minutes | L 137.3° R 137.6° |
| 47 | A | 3 wt. % Cocamide DEA | 0 minutes | L 133.5° R133.6° |
| | | | 15 minutes | L 128.4° R128.4° |
| 48 | A | 2 wt. % Cocamide DEA | 0 minutes | L 131.6° R 131.6° |
| | | | 15 minutes | L 126.7° R 126.7° |
| 49 | A | 1 wt. % Cocamide DEA | 0 minutes | L 129.3° R129.7° |
| | | | 15 minutes | L 119.3° R120.7° |
| 50 | A | Dimethicone (burnished) | 0 minutes | L 98.8° R 97.1° |
| | | | 3 minutes | L 31.3° R 26.1° |
| 51 | A | 2 wt. % Cocamide DEA (burnished) | 0 minutes | L 124.2° R124.3° |
| | | | 3 minutes | L 119.7° R119.5° |

[1]A proprietary waterproofing agent comprising an organic silicone (Dow Chemical Company, Midland, MI)

We claim:

1. A curable composition comprising:
   (i) one or more polyacid comprising at least two carboxylic acid groups, anhydride groups, or salts thereof;
   (ii) one or more polyol comprising at least two hydroxyl groups;
   (iii) one or more reactive waterproofing agent chosen from a $C_5$ to $C_{30}$ alk(en)yl monocarboxylate of a (poly) alkoxylated trihydric polyol, $C_5$ to $C_{30}$ alk(en)ylamine (poly)alkoxylate, $C_5$ to $C_{30}$ alk(en)yl diamine (poly) alkoxylate, $C_5$ to $C_{30}$ alk(en)ylamine (poly)alkoxylate containing an ether or thiother group in the alk(en)ylamine group, and mixtures thereof; and
   (iv) optionally, one or more phosphorous-containing accelerator,
   wherein the ratio of the number of equivalents of said carboxylic acid groups, anhydride groups, or salts thereof to the number of equivalents of said hydroxyl groups is from 1/0.01 to 1/3,
   further wherein, when the said one or more reactive waterproofing agent (iii) is chosen from a $C_5$ to $C_{30}$ alk(en) ylamine (poly)alkoxylate, $C_5$ to $C_{30}$ alk(en)yl diamine (poly)alkoxylate, and a $C_5$ to $C_{30}$ alk(en)ylamine (poly) alkoxylate containing an ether or thiother group in the alk(en)ylamine group, the said one or more polyacid (i) is chosen from a polyester containing at least two carboxylic acid groups, a polybasic acid, a polybasic acid salt, a polybasic anhydride, an oligomer of a polybasic acid, a salt of an oligomer of a polybasic acid, an oligomer of a polybasic anyhydride, a polymeric polyacid formed by polymerizing at least one ethylenically unsaturated carboxylic acid-functional monomer reactant in the amount of 25 wt. % or more, based on the total weight of the monomer reactants in the polyacid, a polymeric polyacid formed by polymerizing at least one ethylenically unsaturated carboxylic anhydride-functional monomer reactant in the amount of 25 wt. % or more, based on the total weight of the monomer reactants in the said polyacid, and salts thereof.

2. A composition as claimed in claim 1, further comprising water.

3. A composition as claimed in claim 1, wherein the said one or more reactive waterproofing agent (iii) is chosen from a $C_8$ to $C_{18}$ alk(en)yl monocarboxylate of a (poly)alkoxylated trihydric polyol, $C_8$ to $C_{18}$ alk(en)ylamine (poly)alkoxylate, $C_8$ to $C_{-18}$ alk(en)yl diamine (poly)alkoxylate, C8 to $C_{18}$ alk(en)ylamine (poly)alkoxylate containing an ether or thiother group in the alk(en)ylamine group, and mixtures thereof.

4. A composition as claimed in claim 1, wherein the amount of the said one or more reactive waterproofing agent is 10 wt. % or less, based on the total solids of the composition.

5. A composition as claimed in claim 1, further comprising one or more reactive amphiphilic polyols chosen from $C_5$ to $C_{30}$ alkanol (poly)alkoxylates, trihydric polyol (poly)alkoxylates, trihydric polyol monoesters of $C_5$ to $C_{30}$ dicarboxylic acids, $C_5$ to $C_{30}$ alkylene glycols, and mixtures thereof.

6. A composition as claimed in claim 1, further comprising one or more coupling agent, one or more surfactant, or a combination thereof.

7. A composition as claimed in claim 1, further comprising one or more strong acid catalyst having a pKa of $\leq 3.0$, or a mixture of one or more strong acid catalyst plus one or more organic polyacid.

8. A method for treating fibrous, non-woven or composite substrates comprising:
    forming a curable aqueous composition comprising admixing with water or one or more aqueous solvent (i) one or more polyacid comprising at least two carboxylic acid groups, anhydride groups, or salts thereof; (ii) one or more polyol comprising at least two hydroxyl groups; and (iii) one or more reactive waterproofing agent chosen from a $C_5$ to $C_{30}$ alk(en)yl monocarboxylate of a (poly)alkoxylated trihydric polyol, $C_5$ to $C_{30}$ alk(en)ylamine (poly)alkoxylate, $C_5$ to $C_{30}$ alk(en)yl diamine (poly)alkoxylate, $C_5$ to $C_{30}$ alk(en)ylamine (poly) alkoxylate containing an ether or thiother group in the alk(en)ylamine group, and mixtures thereof; and (iv), optionally, one or more phosphorous-containing accelerator, wherein the ratio of the number of equivalents of said carboxylic acid groups, anhydride groups, or salts thereof to the number of equivalents of said hydroxyl groups is from 1/0.01 to 1/3;
    contacting said substrate with said curable aqueous composition or, alternatively, applying said curable aqueous composition to said substrate; and
    heating said curable aqueous composition at a temperature of from 100° C. to 400° C.,
    wherein when the said one or more reactive waterproofing agent (iii) is chosen from a $C_5$ to $C_{30}$ alk(en)ylamine (poly)alkoxylate, $C_5$ to $C_{30}$ alk(en)yl diamine (poly) alkoxylate, and a $C_5$ to $C_{30}$ alk(en)ylamine (poly) alkoxylate containing an ether or thiother group in the alk(en)ylamine group, the said one or more polyacid (i) is chosen from a polyester containing at least two carboxylic acid groups, a polybasic acid, a polybasic acid salt, a polybasic anhydride, an oligomer of a polybasic acid, a salt of an oligomer of a polybasic acid, an oligomer of a polybasic anhydride, a polymeric polyacid formed by polymerizing at least one ethylenically unsaturated carboxylic acid-functional monomer reactant in the amount of 25 wt. % or more, based on the total weight of the monomer reactants in the polyacid, a polymeric polyacid formed by polymerizing at least one ethylenically unsaturated carboxylic anhydride-functional monomer reactant in the amount of more than 25 wt. % or more, based on the total weight of the monomer reactants in the said polyacid, and salts thereof.

9. A fibrous article, non-woven article or composite substrate prepared by the method as claimed in claim 8.

\* \* \* \* \*